United States Patent [19]

Meshri et al.

[11] 3,925,539

[45] Dec. 9, 1975

[54] PROCESSES OF SYNTHESIZING ANHYDROUS LITHIUM HEXAFLUOROARSENATE

[75] Inventors: Dayal T. Meshri; Darrell L. Westfall, both of Sand Springs, Okla.

[73] Assignee: Ozark-Mahoning Company, Tulsa, Okla.

[22] Filed: July 12, 1974

[21] Appl. No.: 487,976

[52] U.S. Cl. .................................. 423/464; 423/472
[51] Int. Cl.² ................ C01B 27/00; C01B 27/02; C01D 15/00
[58] Field of Search ............. 423/464, 472, 423/87, 88, 483

[56] References Cited
OTHER PUBLICATIONS

AEC-tr-3927 (pt. 1), "The Chemistry of Fluorine and Its Inorganic Compounds," by I. G. Ryss, U.S. Atomic Energy Comm.

*Primary Examiner*—Edward Stern
*Attorney, Agent, or Firm*—Thomas M. Scofield Esq.

[57] ABSTRACT

Improved processes of producing lithium hexafluoroarsenate ($LiAsF_6$) by passing $AsF_5$ through a mixture of $AsF_3$, LiF and anhydrous hydrogen fluoride or a mixture of LiF and anhydrous hydrogen fluoride alone.

19 Claims, No Drawings

PROCESSES OF SYNTHESIZING ANHYDROUS LITHIUM HEXAFLUOROARSENATE

BRIEF DESCRIPTION OF THE INVENTION

Recently, anhydrous lithium hexafluoroarsenate ($LiAsF_6$) has created a great interest as an electrolyte in the field of nonaqueous high energy density batteries, especially those systems requiring lithium anode. This compound is used in lithium cells. These power cells are safe, practical, durable through storage and highly shock resistant.

The first synthesis of anhydrous $LiAsF_6$ was reported by Cox (1), whose product was analyzed as $LiAsF_6.0.4LiF$ and later by Sharp et al (2) in which they fluorinated a mixture of LiF and $As_2O_5$ by liquid $BrF_3$. Dess and Parry (3) were the first to report the syntheses of hexafluoroarsenate salts ($KAsF_6$, $NH_4AsF_6$, and $CsAsF_6$) by neutralization of hexaaquo hexafluoro arsenic acid ($HAsF_6.6H_2O$). The material obtained by the above processes did not have the high purity which is essential for the application of this compound in high energy density batteries.

Since then, several attempts have been made to prepare high purity anhydrous $LiAsF_6$ including the ion exchange process (4); metathetical reactions in methyl formate (5–7, inclusive) and the use of acetonitrile (8) after acid base neutralization.

In Lawless et al (9), a limited recovery was obtained from long term, high temperature reaction of $AsF_5$ and dried LiF. No reaction of LiF and $AsF_5$ was observed at 25°C and only partial conversion occurred in three days at 175°C or with HF as a solvent at –40°C.

The current methods for the preparation of high purity $LiAsF_6$ require several complicated steps and they are very time consuming, especially the one used in the dehydration of lithium hexafluoroarseante trihydrate. These processes always leave several hundred parts per million of water in the final product which is seriously objectionable to the lithium anode.

We have successfully developed new and economical methods for the synthesis of high purity anhydrous lithium hexafluoroarsenate $LiAsF_6$ in very high yields.

OBJECTS OF THE INVENTION

A first object of the instant invention is to provide improved processes and methods for synthesizing anhydrous $LiAsF_6$ (lithium hexafluoroarsenate).

Another object of the invention is to provide improved processes for synthesis of anhydrous lithium hexafluoroarsenate which provide absolutely anhydrous $LiAsF_6$. This is the first time when $LiAsF_6$ has been made which has no detectable amount of water present therein.

Another object of the invention is to provide such methods and processes of synthesis where very high purity $LiAsF_6$ is produced in very high yields.

Another object of the invention is to provide an improved process of producing anhydrous $LiAsF_6$ by passing $AsF_5$ through LiF dissolved in anhydrous hydrogen fluoride.

Another object of the invention is to provide a process of producing anhydrous lithium hexafluoroarsenate by passing $AsF_5$ through a mixture of LiF, anhydrous hydrogen fluoride and $AsF_3$.

Still another object of the invention is to provide such processes of producing anhydrous lithium heaxafluoro arsenate wherein the $AsF_5$ may be generated by passing elemental fluorine through either $AsF_3$ or a mixture of $AsF_3$ and anhydrous hydrogen fluoride.

Other and further objects of the invention will appear in the course of the following description thereof.

THE PRIOR ART

Applicants are aware of the following prior art publications which are referred to in this specification:

1. B. Cox J. Chem. Soc. 876 at 877 (1956) "Complex Fluorides. Part IV. The Structural Chemistry of Complex Fluorides . . . "
2. R. D. W. Kemmitt, D. R. Russell and D. W. A. Sharp, J. Chem. Soc. 4408 at 4412 (1963) "The Structural Chemistry of Complex Fluorides . . . "
3. H. M. Dess and R. W. Perry, J. Am. Chem. Soc. 79, 1589 (1957) "The Preparation and Properties of Complex Fluoroarsenates"
4. G. Atkinson and C. J. Hallade, J. Phys. Chem. 64, 1487 at 1488 (1960) "The Conductance of Hexafluoroarsenic Acid . . . "
5. Honeywell, Inc. Contract NAS3-10613; Final report (for the period May 31, 1967 — Apr. 30, 1968); Report NASA CR-72,535, National Aeronautics and Space Administration, Office of Scientific and Technical Information.
6. Monsanto Research Corp., Contract NAS3-9431, Final Report (Sept. 1968); Report NASA CR-72,464. National Aeronautics and Space Administration, Office of Scietific and Technical Information.
7. William N. Smith, Jr., Foote Mineral Co., U.S. Pat. No. 3,655,332, issued Apr. 11, 1972 for "Process for Preparing Lithium Compounds . . . "
8. Robert A. Wiesboeck, U. S. Steel Corp., U.S. Pat. No. 3,654,330 issued Apr. 4, 1972, for "Tetraacetonitrilolithium Hexafluorophosphate . . . "
9. Edward W. Lawless, et al J. Inorg. Chem., Volume 10, Page 1,084 (1971) "Lithium Hexafluoroarsenate . . . "

DETAILED DESCRIPTION

In a first procedure, the chemicals employed are anhydrous HF, $AsF_3$, $AsF_5$, $F_2$ and LiF.

In a first container designated a reactor or reaction vessel, dry lithium fluoride is added to $AsF_3$. This typically results in a milky solution. To obtain a clear solution, anhydrous HF is added. The reaction between anhydrous hydrogen fluoride and LiF solution in AsFhd 3 is very vigorous and should be done carefully to avoid a loss due to spillage. External cooling may be employed to moderate this reaction. These operations result in a mixture of LiF, anhydrous hydrogen fluoride and $AsF_3$ in the reactor or reaction vessel.

Another vessel to be used as a generator for $AsF_5$ gas is filled either with $AsF_3$ or a mixture of $AsF_3$ and anhydrous hydrogen fluoride. In the latter case, a preferred mixture is 70% $AsF_3$ and 30% anhydrous hydrogen fluoride. However, any proportion of $AsF_3$ and anhydrous hydrogen fluoride can be used for the generation of $AsF_5$. In the absence of anhydrous hydrogen fluoride, the reaction between $AsF_3$ and the elemental fluorine which is to be bubbled therethrough is very exothermic. In such case, external cooling is typically required.

The reaction vessel and generator are connected to each other by suitable conduit or tubing, for the passage of $AsF_4$ gas. A fluorine input line or conduit is inserted in the generator vessel and slow fluorine flow is started into the $AsF_3$ (or $AsF_3$ and anhydrous hydrogen fluoride). As the fluorine starts bubbling through the $AsF_3$ or mixture thereof with HF, it produces $AsF_5$ which is passed through the conduit or tubing to the reaction vessel and bubbles through the LiF solution. A small amount of unreacted fluroine is also typically carried with $AsF_5$, this reacting with $AsF_3$ present in the reaction vessel to produce more $AsF_5$.

The generation of $AsF_5$ and the bubbling of it through the LiF solution in the reaction vessel is continued until no further gain in the weight of the reaction vessel is obtained. Said otherwise, the contents of the vessel are saturated with $AsF_5$. Once the saturation is achieved, the reactor and the generator are disconnected, capped and allowed to stay (typically at ambient temperature over a period of twelve to sixteen hours in order to complete the reaction.

After standing, a dry inert gas, such as dry nitrogen, is passed into the reaction vessel and over the contents of the reactor until all volatile materials (such as $AsF_5$, HF and $AsF_3$) are removed, with white crystals being left behind in the reactor.

Samples of the product crystals are weighed and tested for the presence of free F—, as well as for their solubility in organic solvents (such as methyl formate, acetonitrile, acetone, etc.). As lithium fluoride is insoluble in the above solvents, any insoluble residue present in these crystals typically indicate the presence of unreacted LiF. Such also can be compared with free F— analysis. If a substantial amount of free F— is found present in the crystals, same may be dissolved again in HF and the above process repeated for one or more times to obtain quantitative conversion.

Specifically, after dissolving the product crystals in HF, $AsF_5$ is again generated and bubbled therethrough until no further gain in the weight of the reaction vessel or reactor is obtained. Thereafter, after achievement of saturation with $AsF_5$, the reactor and generator are disconnected, capped and allowed to stand for a period typically twelve to sixteen hours. Then a dry inert gas removes all volatile materials and the product white crystals are again tested.

The final drying of the white crystals of $LiAsF_6$ is done by heating under nitrogen atmosphere or drying same under vacuum. The crystals may be washed with anhydrous benzene or pentane or remove the HF odor if present.

In a variation of the subject process, and particularly in order to avoid the exothermic addition of anhydrous hydrogen fluoride to the $LiF$-$AsF_3$ solution, LiF may be dissolved in anhydrous HF. Thereafter, $AsF_5$ produced in the generator (previously described) is bubbled through the said solution at ambient temperature. All of the other steps of the process previously described (other than the obtaining of the mixture of $LiF$-$AsF_3$-anhydrous hydrogen fluoride, replaced by LiF-anhydrous hydrogen fluoride solution) are carried out in the same order as previously described.

The latter process may be varied by simply utilizing already available $AsF_5$ from a storage cylinder in place of the generation process. That is, a clear solution of LiF is prepared by dissolving same in anhydrous HF. Same is converted to $LiAsF_6$ by passing $AsF_5$ from the storage cylinder. All other steps involving saturation of LiF solution with $AsF_5$, drying and washing of crystals are similar to the process originally described.

Yet further, it should be understood that the mixture of the basic procedure (LiF, anhydrous hydrogen fluoride and $AsF_3$ in a reaction vessel) may be treated by $AsF_5$ which is available from inventory or storage cylinder, rather than the generator described with respect to the basic process. Other than the substitution of the $AsF_5$ from inventory or storage cylinder, all of the steps of the basic process, as described, are employed.

With respect to usable equipment, Teflon (TM) bottles may be employed for the reaction vessel and $AsF_5$ generator. For transmission of $AsF_5$ gas from the generator into the mixture in the reaction vessel, Teflon (TM) tubing may be employed. The tubing connecting the fluorine line and the generator vessel is preferably of nickel. Although copper tubing may be used in the latter instance, corrosion effect is severe.

SPECIFIC EXAMPLES

EXAMPLE I

In this example, one-half gallon Teflon (TM) bottles were employed as both the reaction vessel and $AsF_5$ generator vessel. The reactor was loaded with 105 grams of dry LiF and 1,132 grams of $AsF_3$. After shaking vigorously, the LiF dispersed in the $AsF_3$ resulting in a milky appearance solution. To clarify the solution, 455 grams of anhydrous hydrogen fluoride was slowly added with cooling of the reaction vessel. The arsenic pentafluoride generator was loaded with 983 grams of $AsF_3$ and 440 of anhydrous hydrogen fluoride. A nickel fluorine line was inserted in the generator with the generator then connected to the reaction vessel by Teflon (TM) tubing in such a way that all $AsF_5$ produced in the generator was bubbled through the contents of the reaction vessel. Fluorine flow was then started at a rate of 14 liters per hour. This flow was stopped after six hours as there was no further gain in the weight of the reaction vessel, indicating that the solution was saturated with $AsF_5$.

The reactor and the generator vessels were disconnected, capped and stored overnight at ambient temperature. The following day, dry nitrogen was passed into the reaction vessel at a rate of 20–25 liters per hour. This removed volatile materials such as HF, $AsF_5$, $AsF_3$ and solid material comprising white crystals remained in the reactor. The crystals were tested for hexafluoroarsenate ion with $(C_6H_5)_4AsCl$ (tetraphenyl arsonium chloride) and, also, their solubility in organic solvents, specifically, in acetonitrile, diethylether and methyl formate. Upon dissolving the crystals (solid product) in organic solvents, about 25% insoluable material was observed which analyzed as LiF.

In order to obtain complete reaction, the contents of the reaction vessel were redissolved in anhydrous hydrogen fluoride and $AsF_5$ gas from the generator vessel was passed over into the reaction vessel for another six hours. Thereafter, the capped reaction vessel was stored overnight at ambient temperatures. The following day, the volatile contents were again removed by passing dry nitrogen gas over the reaction medium. The solid product (white crystals) was washed with 10 ml anhydrous hydrogen fluoride to remove traces of $AsF_3$ or unreacted LiF and then dried under nitrogen until it was free from HF fumes. The yield was in the vicinity of 90%.

The analysis of the product was as follows:

| Species | MATERIAL: $LiAsF_6$ | | |
|---|---|---|---|
| | Total F | Free F | $H_2O$ |
| % Found | 58.23% | 0.07% | 0 |
| % Theoretical | 58.2% | | |

| Species | MATERIAL: LiAsF$_6$ Total F | Free F | H$_2$O |
|---|---|---|---|
| % of Theoretical | 100% | | |

The above analysis indicates the LiAsF$_6$ of very high purity was produced. The presence of free F— in trace amount indicated that there was no unreacted LiF or HF in the material. LiAsF$_6$ was made having no detectable amount of water present in same.

EXAMPLE II

Because the addition of anhydrous hydrogen fluoride to the mixture of LiF and AsF$_3$ was markedly exothermic, the procedure was modified as follows:

The reaction vessel was loaded with 115 grams of LiF and 1,261 grams of anhydrous hydrogen fluoride. On stirring the mixture for about 20 minutes, a clear solution was obtained. (No AsF$_3$ was added to the reaction vessel during the carrying out of this particular example, unless small amounts thereof were carried over by AsF$_5$ from the generator.)

The generator was loaded with a mixture of AsF$_3$ and HF (about 70% AsF$_3$ and 30% anhydrous hydrogen fluoride) and same was connected to the reaction vessel as previously described. Fluorine flow into the generator was started at the rate of 16 liters per hour and stopped after six hours as there was no further gain in the weight of the reactor. Then the reactor and generator were disconnected, capped and stored overnight at ambient temperature.

The following day dry nitrogen was passed through the reator at the rate of 25 liters per hour and volatile materials like anhydrous hydrogen fluoride, AsF$_5$ and AsF$_3$ were removed. The reactor was then weighed with its solid contents. This showed that the reaction had proceeded at about 70% to completion.

The solids in the reaction vessel were redissolved in anhydrous hydrogen fluoride and the reaction vessel reconnected to the AsF$_5$ generator. Arsenic pentafluoride was then bubbled through the reactor for another 6 hours, same stopped when no further gain in the weight of the reactor was observed. The volatile contents were again removed by passing dry nitrogen into the reaction vessel and the solid product material was tested for the presence of AsF$_6$— ions. Further, insolubility was tested in the organic solvents. No insoluble material was found in the inorganic solvents, such as methyl formate, acetonitrile, etc., indicating that all LiF was converted into LiAsF$_6$. This material was then washed with small amounts of anhydrous hydrogen fluoride to remove unreacted LiF and/or AsF$_3$.

The material was further dried under nitrogen atmosphere and external heat. Thereafter it was dried under vacuum for a short period to remove any volatiles present.

The described process resulted in 710 grams of LiAsF$_6$ which was about 81.9% yield. The analysis was as follows:

| Species | MATERIAL: LiAsF$_6$ Total F | Free F | Water |
|---|---|---|---|
| % Found | 58.38% | 0.31% | 0 |
| % Theoretical | 58.20% | | |
| % of Theoretical | 100.3% | | |

EXAMPLE III

In this example, 124 grams of LiF were dissolved in 1,276 grams of anhydrous hydrogen fluoride. Thereafter, procedure was carried out similar to that immediately previously described in Example II. The weight of LiAsF$_6$ obtained was 852 grams or 91.2% yield. Analysis of this product was as follows:

| Species | LiAsF$_6$ DW-3-87 Total F | Free F | Water |
|---|---|---|---|
| % Found | 58.4% | 0.24% | 0 |
| % Theoretical | 58.2% | | |
| % of Theoretical | 100.3% | | |

All of the previously described examples clearly indicate that very high purity LiAsF$_6$ can be produced in very high yields by the described processes.

EXAMPLE IV

In this procedure, the previously described AsF$_5$ generator vessel and process was omitted from the system. AsF$_5$ was used supplied directly from a storage bottle.

A sixteen ounce Teflon (TM) bottle comprised the reaction vessel, being loaded with 11.5 grams of LiF and 247 grams of anhydous hydrogen fluoride. A clear solution of LiF and HF was obtained by stirring this mixture for fifteen minutes. The arsenic pentafluoride containing cylinder was connected to the reaction vessel by Teflon (TM) tubing which was inserted into the solution.

A slow flow of AsF$_5$ was started and 74.5 grams of AsF$_5$ were bubbled through LiF solution in two hours. The mixture was stirred vigorously and allowed to stand overnight. The following day dry nitrogen gas was passed over the solution until all volatile materials disappeared. Slightly pink colored crystals were obtained. This coloration was attributed to the traces of impurities present in the AsF$_5$ gas. The color was removed by washing the crystals with 10 ml anhydrous hydrogen fluoride.

The colorless crystals were then dried under nitrogen atmosphere and external heat. The product weight of dried crystals was 74 grams and the yield was 85.5% on the basis of LiF used. The analysis was as follows:

| Species | MATERIAL: LiAsF$_6$ Total F | Free F | H$_2$O |
|---|---|---|---|
| % Found | 58.2% | 0.12 | 0 |
| % Theoretical | 58.2% | | |
| % of Theoretical | 100% | | |

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth is to be interpreted as illustrative and not in a limiting sense.

We claim:

1. A process of producing anhydrous $LiAsF_6$ (lithium hexafluoroarsenate) comprising the steps of:
   1. adding dry lithium fluoride to $AsF_3$ in a reaction vessel, thereby obtaining a milky solution of LiF in $AsF_3$,
   2. thereafter adding to said solution anhydrous HF to obtain a clear solution comprising a mixture of LiF, anhydrous HF and $AsF_3$ in said reaction vessel,
   3. flowing gaseous $AsF_5$ through the mixture in the reaction vessel until the contents thereof are saturated with $AsF_5$,
   4. closing the reaction vessel and letting the $AsF_5$ saturated mixture stand therein until the reaction is completed, and
   5. thereafter passing an inert gas into the reactor with all volatile materials (including $AsF_5$, HF and $AsF_3$) are removed therefrom and white crystals of $LiAsF_6$ remain behind in the reaction vessel.

2. A process as in claim 1 wherein the reaction vessel is cooled durin the addition of anhydrous HF to the solution of LiF in $AsF_3$ to moderate the reaction.

3. A process as in claim 1 wherein the $AsF_5$ is generated by flowing gaseous fluorine into a vessel containing $AsF_3$.

4. A process as in claim 3 wherein the generator vessel contains a mixture of $AsF_3$ and anhydrous HF.

5. A process as in claim 4 wherein the mixture is 70% $AsF_3$ and 30% anhydrous HF.

6. A process as in claim 3 wherein the generator vessel is cooled during the addition of elemental fluorine thereto in the generation of $AsF_5$ gas.

7. A process as in claim 1 wherein the white crystals of $LiAsF_6$ are tested for the presence of lithium fluoride and when a substantial amount of same is found present in the crystals, same are dissolved in anhydrous HF for repetition of the process.

8. A process as in claim 7 wherein the crystals are additionally tested for solubility in organic solvents for the presence of unreacted LiF.

9. A process as in claim 1 including drying the white crystals of $LiAsF_6$ and washing same to remove HF odor when present.

10. A process as in claim 1 wherein the reaction vessel is capped and permitted to stand from 12 to 16 hours prior to removal of volatile materials with inert gas.

11. A process of producing anhydrous $LiAsF_6$ (lithium hexafluoroarsenate) comprising the steps of:
    1. dissolving dry lithium fluoride in anhydrous HF in a reaction vessel,
    2. flowing gaseous $AsF_5$ through the mixture in the reaction vessel until the contents thereof are saturated with $AsF_5$,
    3. thereafter closing the reaction vessel and permitting the $AsF_5$ saturated mixture to stand until the reaction is completed,
    4. thereafter passing a dry inert gas into the reaction vessel until all volatile materials (including $AsF_5$, HF and $AsF_3$) are removed and white crystals of $LiAsF_6$ remain behind in the reaction vessel.

12. A process as in claim 1 wherein the $AsF_5$ is generated by flowing gaseous fluorine into a vessel containing $AsF_3$.

13. A process as in claim 12 wherein the generator vessel contains both $AsF_3$ and anhydrous HF.

14. A process as in claim 13 wherein the mixture in the generator vessel comprises substantially 70% $AsF_3$ and 30% anhydrous HF.

15. A process as in claim 12 wherein the generator vessel is cooled during the passage of elemental fluorine therethrough in the production of $AsF_5$.

16. A process as in claim 11 wherein the crystals are tested for the presence of lithium fluoride and when a substantial amount of same is found present therein, the crystals are dissolved again in anhydrous HF for repetition of the process.

17. A process as in claim 11 wherein the crystals are additionally tested for their solubility in organic solvents with any insoluble residue present in same indicating the presence of unreacted LiF.

18. A process as in claim 11 wherein the white crystals of $LiAsF_6$ are dried and washed to remove HF odor when present.

19. A process as in claim 11 wherein the reaction vessel is capped and permitted to stand from 12 to 16 hours after $AsF_5$ treatment.

* * * * *